United States Patent [19]

Morine et al.

[11] 3,734,356
[45] May 22, 1973

[54] DIRECT TRANSFER SEEDER

[75] Inventors: Richard L. Morine, Mentor; James J. Hokes, Lakewood, both of Ohio

[73] Assignee: Fedco, Inc., Mentor, Ohio

[22] Filed: June 28, 1972

[21] Appl. No.: 267,117

[52] U.S. Cl. ............................................. 222/199
[51] Int. Cl. ............................................. B65g 3/12
[58] Field of Search .................. 222/199, 189, 196, 222/200, 160, 161, 181; 209/313, 404; 118/7

[56] References Cited
UNITED STATES PATENTS
3,528,386  9/1970  Morine ............................. 118/7

*Primary Examiner*—Stanley H. Tollberg
*Attorney*—Daniel G. Blackhurst

[57] ABSTRACT

The specification and drawings disclose an apparatus particularly suited for dispensing material such as seeds and the like. The disclosed embodiment comprises an elongated generally horizontally extending main frame adapted to be positioned over the path of movement of the surfaces on which the material is to be deposited. Carried by the main frame are a plurality of hopper assemblies each including a downwardly facing wall open in a pattern corresponding to the surfaces on which material is to be deposited. Reticulated means such as wire mesh are connected across the open pattern. Each of the hopper assemblies are carried from the main frame by support means including connecting means for releasably connecting the hopper assemblies to the main frame while permitting individual adjustment longitudinally thereof. Vibrating means are connected to each hopper assembly for applying high frequency, short amplitude vibrations thereto.

13 Claims, 5 Drawing Figures

Patented May 22, 1973 3,734,356

DIRECT TRANSFER SEEDER

BACKGROUND OF THE INVENTION

The subject invention is directed toward the art of dispensing equipment and, more particularly, to an improved apparatus for dispensing particulate material onto moving surfaces.

The invention is especially suited for dispensing poppy seeds and the like onto dough pieces during their transfer from a proofer to an oven and will be described with particular reference thereto; however, as will become apparent, the invention is capable of broader application and could be used in other environments for dispensing a variety of materials.

In many bakeries the production of buns, rolls and the like involves direct transfer of the dough pieces from the proofer to the oven. Typically, to save space and reduce the length of conveying apparatus required, the outlet from the proofer is closed to and aligned with the inlet to the oven.

If it was desired to produce seeded rolls, (i.e., rolls having sesame seeds or the like deposited on their outer surface) it was necessary to install special conveying equipment to move the pans of dough pieces laterally from the proofer outlet, through a seed depositing machine, and then back into alignment with the oven. Only by using the wasteful "waterfall" seeding apparatus was it possible to do the seeding between the proofer and the oven.

BRIEF DESCRIPTION OF THE INVENTION

The subject invention overcomes the above-discussed problems and provides an apparatus which is extremely efficient in operation and in utilization of space. In accordance with a primary aspect of the invention the apparatus comprises an elongated generally horizontally extending main frame adapted to be positioned over the path of movement of the surfaces on which the material is to be deposited. Carried by the main frame are a plurality of hopper assemblies each including a downwardly facing wall open in a pattern corresponding to the surfaces on which material is to be deposited. Reticulated means are connected across the open pattern. Each of the hopper assemblies are carried from the main frame by support means including connecting means for releasably connecting the hopper assemblies to the main frame while permitting individual adjustment longitudinally thereof.

Preferably, and in accordance with a more limited aspect, each of the support means for hopper assemblies preferably comprises a horizontally extending support frame and a hopper releasably connected thereto. The support frames are preferably mounted for individual adjustment longitudinally of the main frame and the connecting means include clamp members carried by the support frames.

In addition, it is contemplated that each of the hopper assemblies will include vibrating means for applying a high frequency vibration thereto. By properly sizing the openings in the reticulated means, the particulate material will flow therethrough only when vibrated. In the preferred embodiment, the vibrating means include air operated vibrators rigidly connected to the support frames. Also, means are provided for sensing the approach of a surface on which material is to be dispensed and actuating the vibrators. Moreover, it is preferable that means be provided to control the time period during which the vibrators are energized.

Accordingly, a primary object of the invention is the provision of an apparatus for dispensing particulate material in predetermined patterns and which is particularly useful for dispensing or depositing poppy seeds or the like onto dough pieces as they are directly transferred from a proofer to an oven.

A further object of the invention is the provision of an apparatus of the type described wherein a plurality of individually adjustable and actuable dispensing units are carried on an elongated horizontally extending frame.

Another object of the invention is the provision of an apparatus of the general type discussed wherein the pattern of depositing can be rapidly changed as required.

A still further object is the provision of a dispensing apparatus wherein a plurality of individually actuable dispensing units are arranged to dispense material in predetermined patterns onto subjacent surfaces.

BRIEF DESCRIPTION OF THE DRAWINGS

The above and other objects and advantages will become apparent from the following description when read in conjunction with the accompanying drawings, wherein.

DETAILED DESCRIPTION OF THE DRAWINGS

Figure 1:
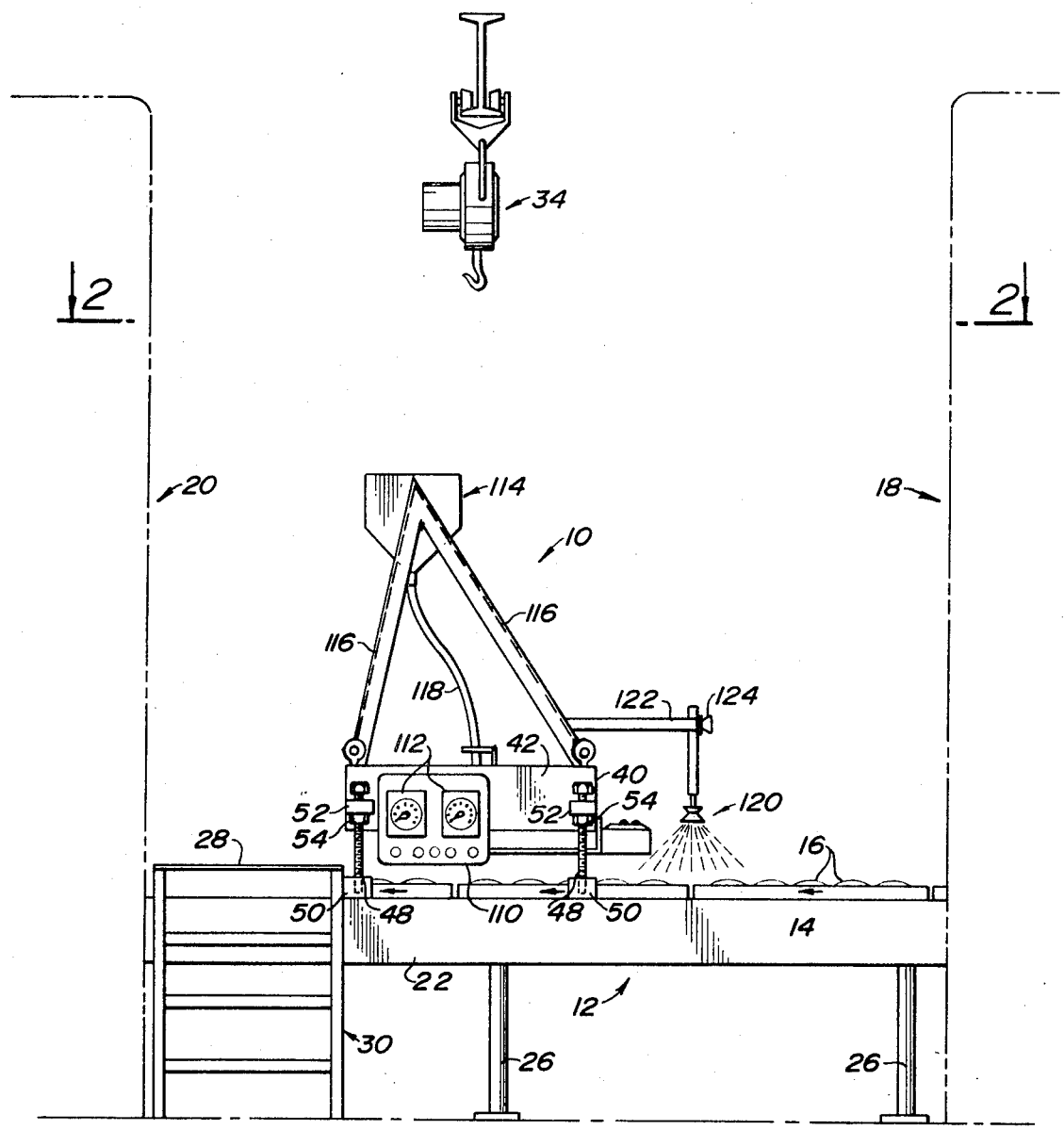
FIG. 1 is an end view of a preferred embodiment of the invention showing it mounted between a proofer and an oven for depositing poppy seeds or the like directly onto the moving trays of dough pieces as they are conveyed from the proofer to the oven.
Figure 2:
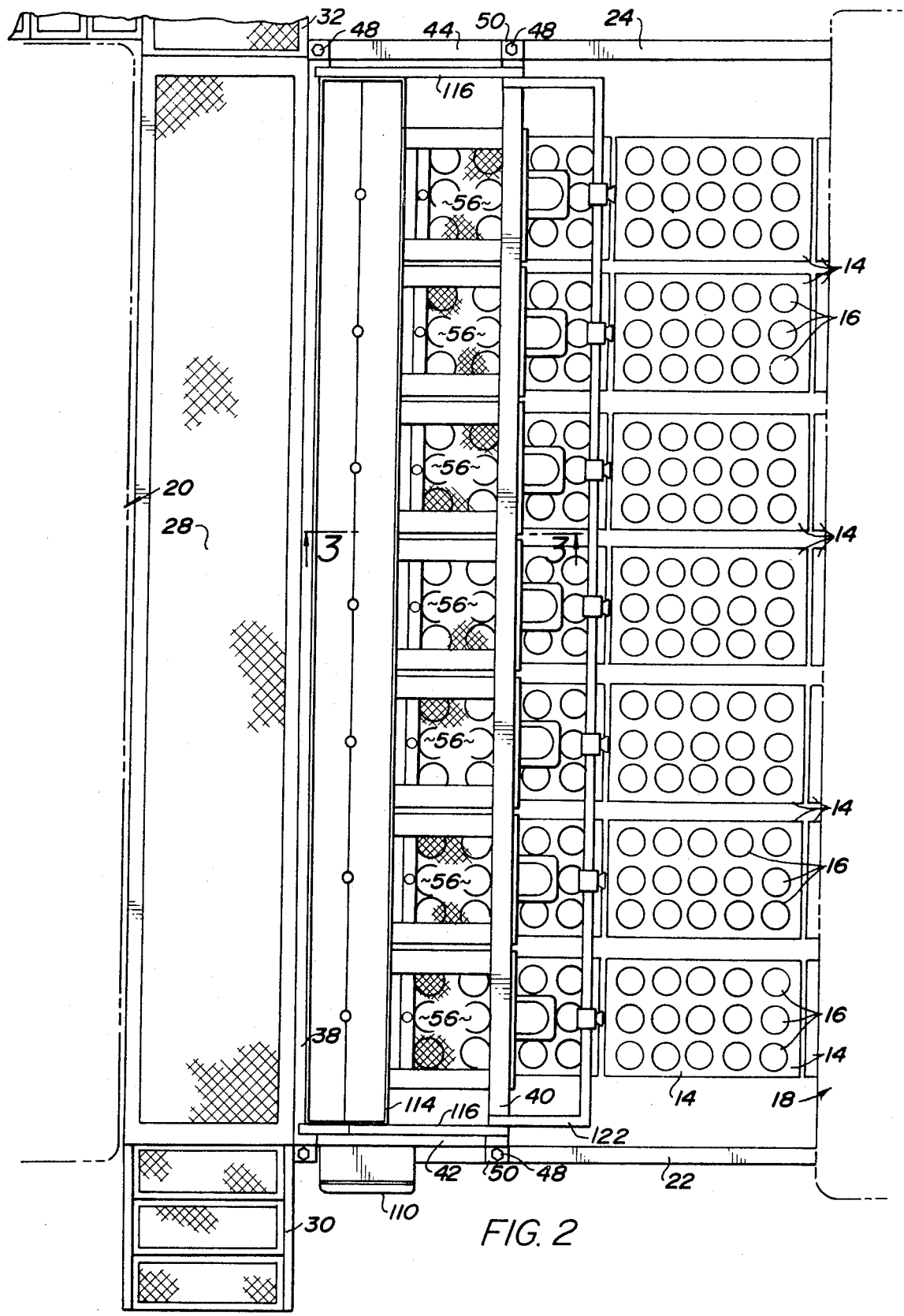
FIG. 2 is a plane view of the apparatus shown in FIG. 1.

Referring more particularly to the drawings wherein the showings are for the purpose of illustrating a preferred embodiment of the invention only and not for the purpose of limiting same, FIGS. 1 and 2 show the dispensing assembly 10 positioned on a conveyor 12 which functions to transfer pans 14 carrying dough pieces 16 directly from the outlet of a proofer 18 to the inlet of an oven 20. The particular type of conveyor 12 used to transfer the trays 14 between the proofer 18 and the oven 20 forms no part of the invention. It should be noted, however, that the conveyor is illustrated as being supported from a suitable frame including side frame members 22 and 24 carried on legs 26. As shown in FIG. 2, a catwalk or walkway 28 extends over the conveyor between suitable steps 30 and 32. The catwalk 28 permits passage between the proofer and oven and, also, as will subsequently become apparent, permits access to the dispensing assembly 10 for filling with seeds and the like. Additionally, although it forms no part of the invention, a power hoist 34 is mounted over the dispensing assembly 10 to permit it to be removed or merely lifted for certain changes over operations as will become apparent.

In the embodiment under consideration, the conveyor 12 is illustrated as conveying seven rows of pans 14 in side-by-side relationship between the proofer and the oven. Each of the pans 14 is shown as containing three rows each of five dough pieces such as hamburger buns. It should be appreciated, however, that the particular number and size of the pans, as well as the type and location of dough pieces, could vary from that shown.

Figure 3:
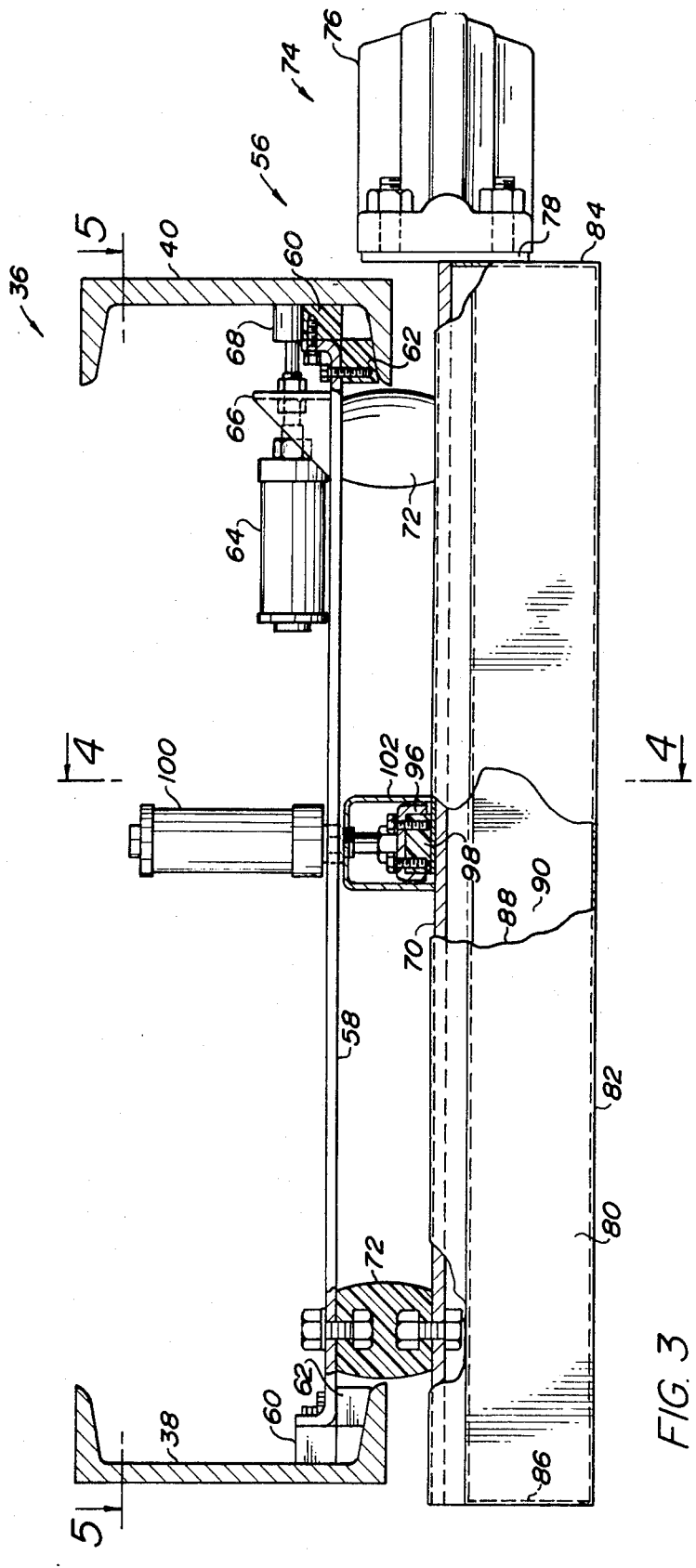
FIG. 3 is an enlarged cross-sectional view taken on line 3—3 of FIG. 2 showing in substantial detail one of the dispensing assemblies.

The dispensing assembly 10 is, in the subject embodiment, carried from the frame of conveyor 12 and extends horizontally across the conveyor. Although the details of construction could vary substantially from that shown, the dispensing assembly 10 is illustrated as comprising a main frame 36 formed from four sections of structural channel including side members 38 and 40 (see FIG. 3) interconnected by end members 42 and 44. The frame 36 is supported over the conveyor 12 in any suitable manner. In the subject embodiment the supports comprise four adjustable legs in the form of bolts 48 located at each of the four corners of the frame in the manner best shown in FIGS. 1 and 2. As illustrated in FIG. 1, the bolts 48 are received in blocks 50 welded to the conveyor side frame members 22 and 24. Outwardly extending bracket members 52 are welded to the ends of the main frame 36 and are provided with suitable openings through which the bolts 48 pass. Adjusting nuts 54 are threadedly received on the legs 48. By varying the position of the nuts 54 the main frame can be leveled and/or raised or lowered. Also, it should be noted that the lower ends of the legs 48 are merely loosely received in the blocks 50 so that the entire dispensing assembly 10 can be lifted off of the conveyor without releasing any connections or the like.

Carried from the main frame 36 are a plurality of individual hopper assemblies 56. Hopper assemblies 56 are mounted for longitudinal adjustment from the main frame 36. The details of the hopper assemblies 56 and their mounting arrangement can best be seen in FIGS. 3 through 5. As shown, each of the hopper assemblies 56 includes a horizontally extending support frame 58 which is received between the side frames 38 and 40 of the main frame 36. Frame 58 is of generally rectangular configuration and has upwardly turned end portions to which are connected four guide blocks 60 formed from plastic or the like. The blocks are connected to the ends of the plate in any convenient manner and serve to position the plate between the side frame members 38 and 40 while permitting free sliding movement therealong. Additionally, similar blocks 62 are positioned under the plate 58 and rest on the lower flanges of the side frames 38 and 40.

In the embodiment under consideration, means are provided for clamping the support frame 58 in desired positions of longitudinal adjustment. These means can take many forms but are shown as an air cylinder 64 supported by a bracket 66 mounted at the right hand end of frame 58 as viewed in FIG. 3. The piston rod extends outwardly and carried the clamp block 68. By actuating the cylinder 64 the clamp block 68 is driven outwardly into clamping engagement with the side frame 40 thereby locking the frame 58 in a desired position of adjustment.

Suspended from frame 58 is a generally U-shaped support frame 70 which is resiliently connected to frame 58. In the subject embodiment, frame 70 is connected to and supported from frame 58 by cylindrical support member 72 of rubber or the like. The support members 72 are suitably bolted or otherwise positively connected to plate 58 and support frame 70. At the right hand end of support frame 70 a vibrating means 74 is positioned and arranged to impart high frequency short amplitude vibrations to the frame. The vibrating means could be of many types but is shown as a conventional pneumatic vibrator 76. Vibrator 76 is bolted or otherwise positively connected to a vertically extending plate 78 welded to the end of frame 70.

Figure 4:
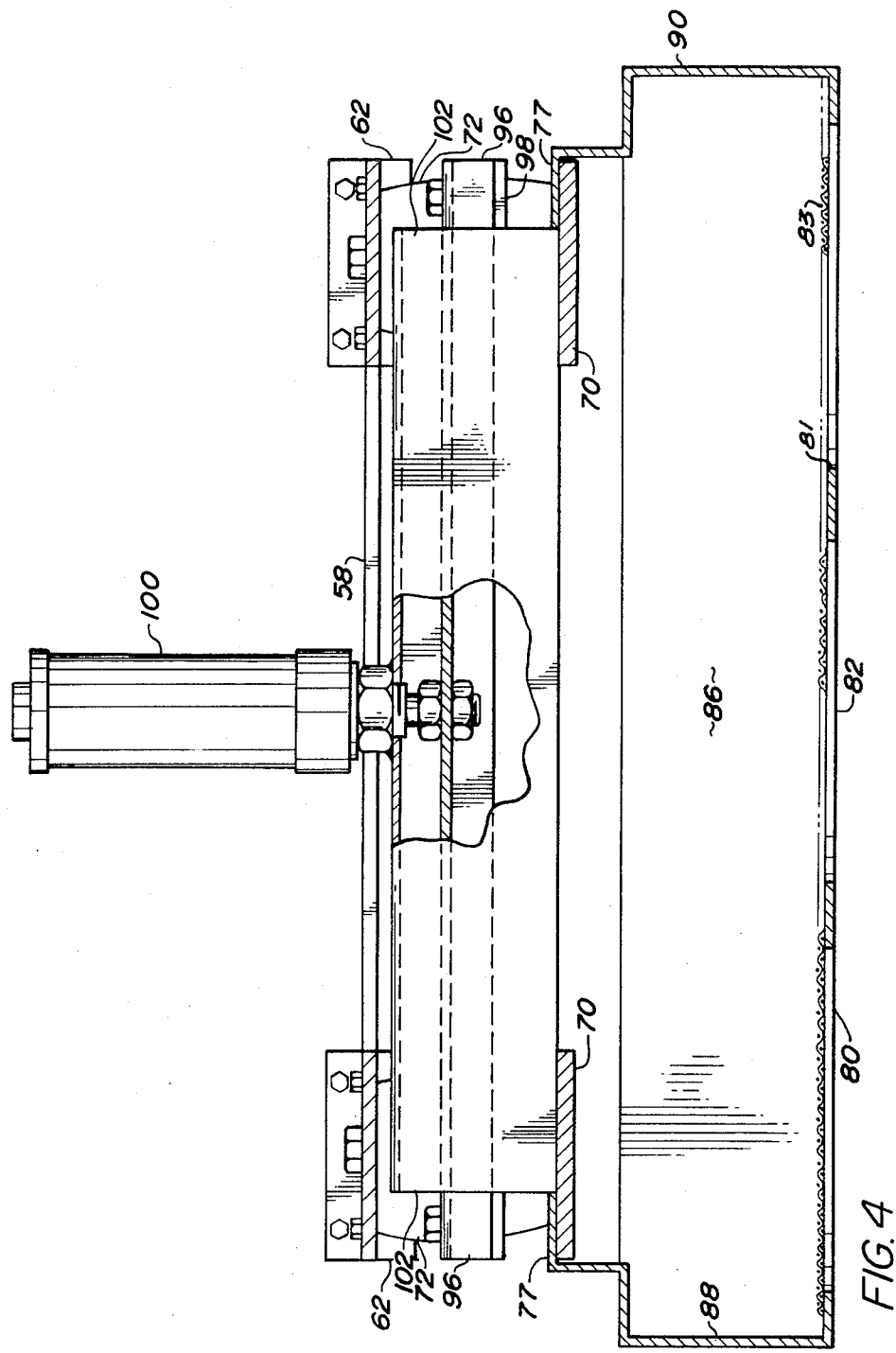
FIG. 4 is a cross-sectional view taken on line 4—4 of FIG. 3.
Figure 5:
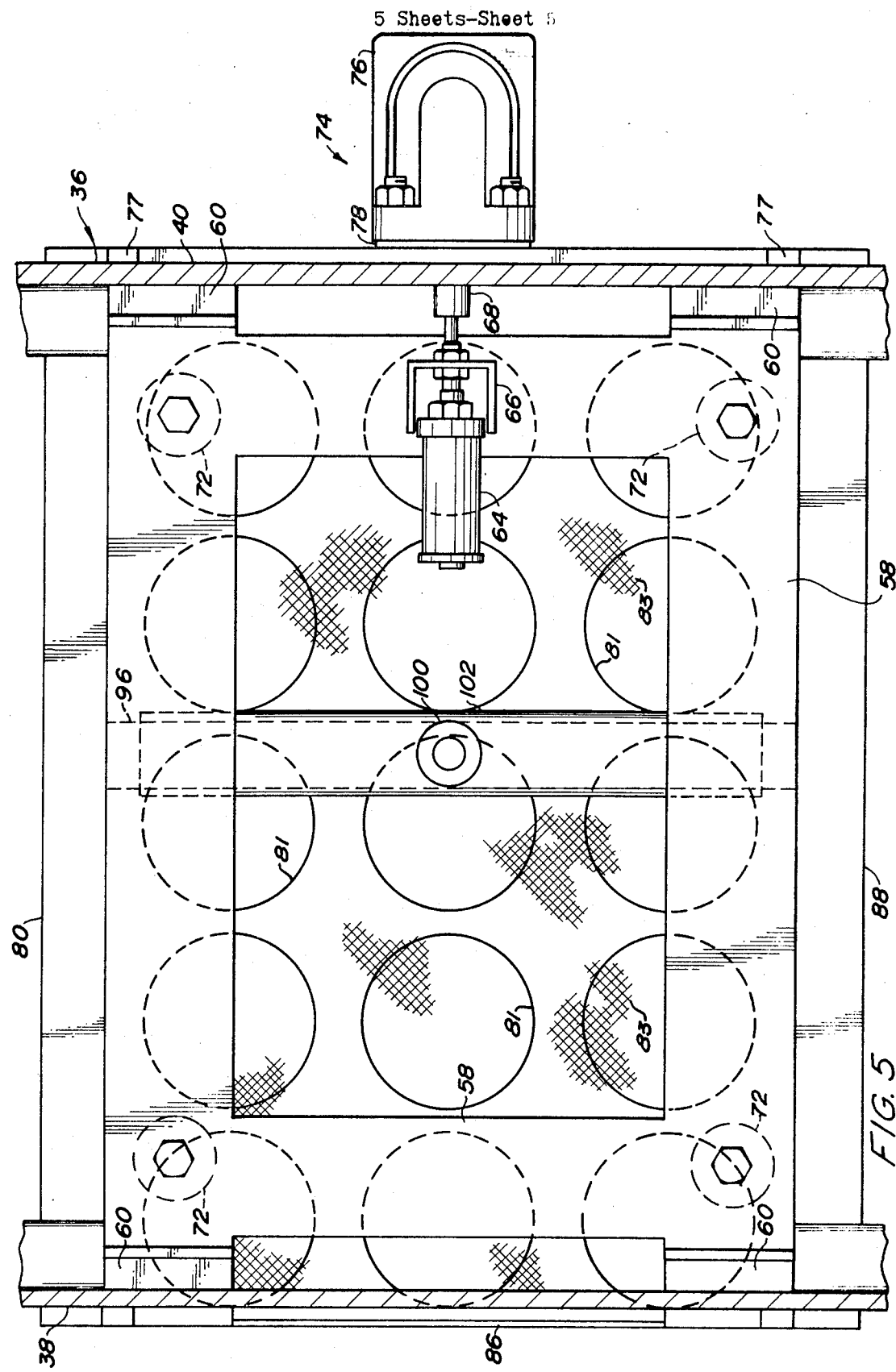
FIG. 5 is a cross-sectional view taken on line 5—5 of FIG. 3.

Connected with frame 70 and support thereby is a hopper member 80 formed from relatively light gauge sheet metal. As best seen in FIG. 4, hopper 80 includes a bottom wall 82 and a pair of end walls 84 and 86 interconnected by side walls 88 and 90. Side walls 88 and 90 extend upwardly a short distance above end walls 84 and 86. Additionally, the side walls include inwardly extending flanges 77 which are received over frame 70. As viewed in FIG. 3, the hopper 80 can be removed from frame 70 merely by sliding it to the left. The bottom wall 82 of hopper 80 is open throughout a pattern corresponding to the desired dispensing pattern of the seeds and the like. Referring to FIG. 2 it should be understood that when used to dispense on pans of the type disclosed and having dough pieces positioned as shown, the bottom of hopper 80 will have fifteen circular openings 81 located to correspond to the dough pieces 16. Connected across the openings as shown in FIG. 5 are reticulated means such as fine wire screening 83. This general type of dispensing means is described in U.S. Pat. No. 3,528,386. In general, by properly sizing the openings of the screen relative to the size of the particular material and the screening are quiescent. However, upon a rapid short amplutude vibration being imparted to the hopper and/or the material, the material will pass through the screen to the subjacent surface. The particular screen sizes required for various types of seeds are described in some detail in the above mentioned prior U.S. patent and the said patent is incorporated herein by reference.

As can be appreciated, in order to assure that the vibrations applied to frame 70 by the vibrator 76 are conducted to the hopper, means must be provided for positively connecting the hopper 80 to the frame 70. These means could take many forms but, in the subject embodiment, comprise a clamp bar 96 which extends across frame 70 a short distance thereabove. The ends of clamp bar 96 are provided with clamp pads 98 formed from any suitable material such as polypropylene or the like. As shown, when the clamp bar is actuated downwardly the clamp pads 98 engage the overlying flanges of the sides of hopper 80 and firmly clamp them to the frame 70. The means for actuating the clamp bar include an air actuated cylinder 100 which is carried by a U-shaped member 102 extending between and joined to the sides of frame 70. The piston rod of cylinder 100 extends downwardly and is positively connected to the clamp bar 96.

As can be appreciated, various air connections and controls must be provided for the air cylinders 64 and 100 as well as the vibrators 76. These various connections are not illustrated in the drawings since they form no specific part of the invention and would merely obscure the drawings. Additionally, it should be understood that various types of controls can be used to assure actuation of the vibrators at the proper time relative to the pans and dough pieces moving under the dispenser. In the aforementioned U.S. patent several types of suitable controls are disclosed. Primarily, it is desired to sense the approach of pans such as by the use of an electric eye, proximity switch or micro switch and thereafter energize the vibrators for a desired predetermined time. By controlling the amplitude and/or duration of the vibrations the quantity of material dispensed can be closely controlled.

Referring again to FIG. 1, it can be seen that a control unit 110 is carried at the end of the main frame 36 and includes a pair of timers 112. For exampler, one of the timers can be used for delaying the energization of the vibrators until a predetermined period following the sensing of a pan and the other timer can be used for controlling the duration of the vibrations. This type of control is described in the aforementioned patent.

As can be appreciated, the supply of seeds to the hoppers 80 could be accomplished in many different ways. In the subject embodiment, each of the hoppers 80 are individually supplied from an elongated overhead storage hopper 114 which is supported from the main frame 36 by end support members 116. The hopper 114 can be filled at periodic intervals and the seeds therein are conducted to the individual dispensing hoppers 80 by tubes 118.

In order to assure proper adherence of the seeds to the dough pieces it is preferable to moisten the top surfaces of the dough prior to dispensing of the seeds. In the subject embodiment a plurality of spray nozzles 120 are mounted from a U-shaped frame 122 extending outwardly from the supply hopper supports 116. Preferably, each of the spray nozzles 120 are mounted for longitudinal adjustment on the transversely extending portion 124 of the frame. As shown, each are provided with wing nut actuated clamps so that they can be shifted along member 124. Although not shown, it is to be appreciated that pressurized water is supplied to these nozzles through hoses or the like not shown. Moreover, the fine misting spray produced by these nozzles can be arranged to go continually or, can be interrelated through suitable control valves with the actuation of the dispensing assembly.

Referring again to the support frame 36, it should be appreciated that the frame can be arranged to extend outwardly a substantial distance beyond the conveyor. This provides means by which various of the hoppers can be shifted to a non-operating position if only a narrow band of pans are being conveyed through the proofer and oven. Moreover, each of the individual hopper assemblies can be shifted or deactivated depending upon the particular sequence of pans being conveyed through the units.

What is claimed is:

1. Apparatus for dispensing particulate material onto surfaces comprising:
    an elongated, generally horizontally extending main frame;
    a plurality of hopper assemblies each including a downwardly facing wall having at least one opening formed therein with reticulated means across said opening;
    support means for resiliently supporting said hopper assemblies from said main frame, said support means including connecting means for releasably connecting said hopper assemblies to said main frame and permitting adjustment of said hopper assemblies longitudinally of said frame; and
    vibrating means associated with each of said hopper assemblies for applying high frequency vibration thereto.

2. The apparatus as defined in claim 1 wherein each said hopper assembly includes a support frame carried by said support means and a hopper slidably mounted on said support frame, and means for releasably attaching said hopper to said support frame.

3. The apparatus as defined in claim 2 wherein said means for releasably attaching said hopper to said support frame comprises a releasable clamp member.

4. The apparatus as defined in claim 2 wherein said support frame has lateral edges and wherein said hopper has flange portions which overlie said lateral edges.

5. The apparatus as defined in claim 2 wherein said vibrating means includes separate vibrators for each of said hopper assemblies, said vibrators being positively connected to said support frame for said respective hopper assemblies.

6. The apparatus as defined in claim 2 wherein said support means include slide blocks positioned between said main frame and said support frame, and wherein said connecting means include clamp members extending between said support means and said main frame.

7. Apparatus for dispensing particulate material onto a subjacent surface in a predetermined pattern comprising:
    a first horizontally extending frame including a pair of spaced support surfaces;
    a second frame slidably carried on said support surface;
    means for readily releasably clamping said second frame to said support surfaces;
    a hopper carried by said second frame and having a downwardly facing wall open in said predetermined pattern and having reticulated means across said open portion of said wall, said hopper being releasably connected to said second frame;
    vibrator means carried by said second frame for applying high frequency, short amplitude vibrations to said hopper.

8. The apparatus as defined in claim 7 wherein said second frame includes a first portion extending between said support surfaces and a second portion resiliently supported from said first portion.

9. The apparatus as defined in claim 8 wherein said hopper is slidably received on said second portion.

10. The apparatus as defined in claim 8 wherein said hopper is connected to said second frame by first fluid actuable clamp means and wherein said second frame is releasably connected to said first frame by second fluid actuable clamp means.

11. The apparatus as defined in claim 8 wherein said second portion is pendantly supported from said first portion by resilient mounting blocks, and wherein said vibrator means is carried on said second portion.

12. Apparatus for dispensing particulate material in predetermined patterns onto subjacent surfaces moving thereunder, comprising:
    a generally horizontal first frame extending generally perpendicular to the path of movement of said surfaces, said first frame including a pair of spaced support surfaces;
    a plurality of hopper assemblies extending between and supported on said support surfaces for individual sliding adjustment perpendicularly to the path of movement of said surfaces, each of said hopper assemblies comprising a frame having a first portion and a resiliently supported second portion with a hopper and a vibrator means connected to said second portion, each said hopper having a bottom wall open in a predetermined pattern with reticulated means over said open pattern; and means for selectively actuating said vibrator means.

13. The apparatus as defined in claim 12 wherein said second portion slidably receives said hopper.

* * * * *